United States Patent [19]

Delin et al.

[11] 4,415,884
[45] Nov. 15, 1983

[54] DIAGNOSTIC CIRCUIT FOR PROGRAMMABLE LOGIC SAFETY CONTROL SYSTEMS

[75] Inventors: Michael A. Delin, West Simsbury; Jack A. Schuss, West Hartford, both of Conn.

[73] Assignee: Combustion Engineering, Inc., Windsor, Conn.

[21] Appl. No.: 309,287

[22] Filed: Oct. 7, 1981

[51] Int. Cl.³ .................................... G08B 23/00
[52] U.S. Cl. ............................ 340/500; 340/507; 340/516; 340/532; 340/645; 361/1; 361/23; 361/100
[58] Field of Search ............. 340/500, 501, 505, 506, 340/507, 511, 514, 517, 518, 532, 538, 577, 578, 579, 635, 644, 645, 648, 650, 651, 652, 653, 638, 516; 431/12, 13, 15, 17, 18, 46; 361/189, 190, 1, 23, 67, 100; 307/252 B, 252 Q, 117; 364/431, 477

[56] References Cited
U.S. PATENT DOCUMENTS 3,238,520  3/1966  Van Vlodrop .................. 340/645
3,648,233  3/1972  Clark ............................. 340/644
4,242,713  12/1980  Lewis et al. .................. 340/645

Primary Examiner—Donnie L. Crosland
Attorney, Agent, or Firm—David L. Smith; William W. Habelt

[57] ABSTRACT

A programmable controller (41) based logic system places two electronic output converters (14,18) in series for redundant protection against the inadvertent energization, due to the failure of an image register (66,68) or due to the shorted failure of a triac (10,12) on the output converters (14,18), of an energize-to-start, deenergize-to-stop field device (28). A control and monitor circuit monitors the image registers (66,68) and the output converter (14,18) triacs (10,12) that switch power on and off to the field device (28) to assure that the triacs (10,12) have not failed in an unsafe mode or that the image registers (66,68) have not failed. The monitor circuit continuously monitors both image registers (66,68), the first triac (10) and the series combination of the two triacs (10,12). The monitor circuit intermittently monitors the second image register (66) and the second triac (12). A failure of either or both triacs (10,12) or either or both image registers (66,68) energizes an alarm.

18 Claims, 4 Drawing Figures

DIAGNOSTIC CIRCUIT FOR PROGRAMMABLE LOGIC SAFETY CONTROL SYSTEMS

BACKGROUND OF THE INVENTION

This invention relates to a logic system control and monitor circuit utilizing a programmable controller and in particular to a control and monitor circuit that monitors the integrity of two series output converter triacs and their respective image registers in the control circuit and alarms the condition when one or both triacs fail in the unsafe mode or their respective image registers fail.

Prior to starting up any safety system, it is necessary to assure that all equipment pertaining to start-up and operation is functioning in a safe and proper manner. Prior to start-up of a fossil fuel steam generating unit, the furnace volume must be purged to assure that there are no volatile fuels present in the furnace. To assure that all equipment pertaining to start-up of the boiler is operating in the prepurge mode prior to purging the furnace, the burner management control system monitors the equipment and generates a purge permissive signal. The purge is then operator initiated after the purge permissive signal is generated.

In an energize-to-start, deenergize-to-stop logic system utilizing electronic input and output modules, the shorted failure of a solid state switch such as a triac is a failure in the unsafe mode. Triacs in particular are used because triacs can be switched to the conducting state and conduct current under either voltage polarity. Furthermore, in circuits operating at 60 hertz, successful commutation occurs upon voltage reversal.

Triacs are used on the output converters within the output modules to switch power on or off to the field devices. When an output converter triac fails in the unsafe mode or an output converter image register fails, a field device can be unexpectedly energized and possibly cause a hazardous condition. In the operation of a steam generator, the hazardous condition may be caused by energizing a fuel valve motor at an improper or unsafe time. One known method to prevent the failure of an output converter triac in the unsafe mode or a failure by error in the output converter image register from producing a hazardous condition is to place a second output converter triac in series with the first output converter triac. The two series output converter triacs are then simultaneously switched to change state when it is desired to have a field device energize or deenergize. The redundant output converter triacs decrease the possibility of a field device being energized due to the failure in the unsafe mode of a single output converter triac or a single image register failure as both output converter triacs would have to fail, both image registers would have to fail, or certain combinations of failures would have to occur for a hazardous condition to occur.

Although using series output converter triacs has reduced the possibility that a field device would energize when not required thereby causing a hazardous condition, monitoring the two series output converter triacs in their respective image registers to determine if a failure has occurred, and if a failure has occurred, which of the two image register-output converter triac combinations has failed, has not been adequate. A failure in the unsafe mode has been detected only when both series triacs fail or both image registers fail as the field device remains energized. A failure of only one of the series triacs or image registers would not cause a hazardous operating condition as the field device would be deenergized by the redundant image register-output converter triac. However, should one of the two series triacs or image registers fail in the unsafe mode, the redundant output converter triac-image register combination that has not failed provides no more protection than a single output converter triac-image register.

SUMMARY OF THE INVENTION

A control and monitor circuit utilizing a programmable controller monitors the integrity of two series output converter triacs and their respective image registers in the control circuit such that the safety protection afforded by redundant triacs is maintained in an energize-to-start, deenergize-to-stop logic system. When the logic is not in the start-up and not in the operation stage, the control and monitoring circuit continuously monitors the output converter triacs and their respective image registers to determine if the first triac or image register has failed in an unsafe mode or if both output converter triacs or both image registers or certain combinations of output converters and image registers have failed in an unsafe mode. Should one of the failure conditions occur, an alarm is sounded to indicate the failure condition. The control and monitor circuit intermittently monitors the second triac and image register in the control circuit to determine if the second triac or image register has failed in an unsafe mode. Should a failure occur, the monitor circuit sounds an alarm to indicate the second triac or image register has failed.

The monitoring portion of the circuit includes logic to verify that the input/output communications error checking routine has not turned the respective input module to the off state upon the confirmation of an error and thus make all signals from the module turned off by the error checking routine appear to the central processing unit the same as the signals would be if the modules were pulled for maintenance. This assures that modules turned off by the error checking routine do not give a false indication that an output converter triac or image register has not failed. Furthermore, when an output module is not electrically connected to the programmable controller, the control portion of the circuit does not permit the operation of the field device.

DESCRIPTION OF THE PREFERRED EMBODIMENT

Figure 1:
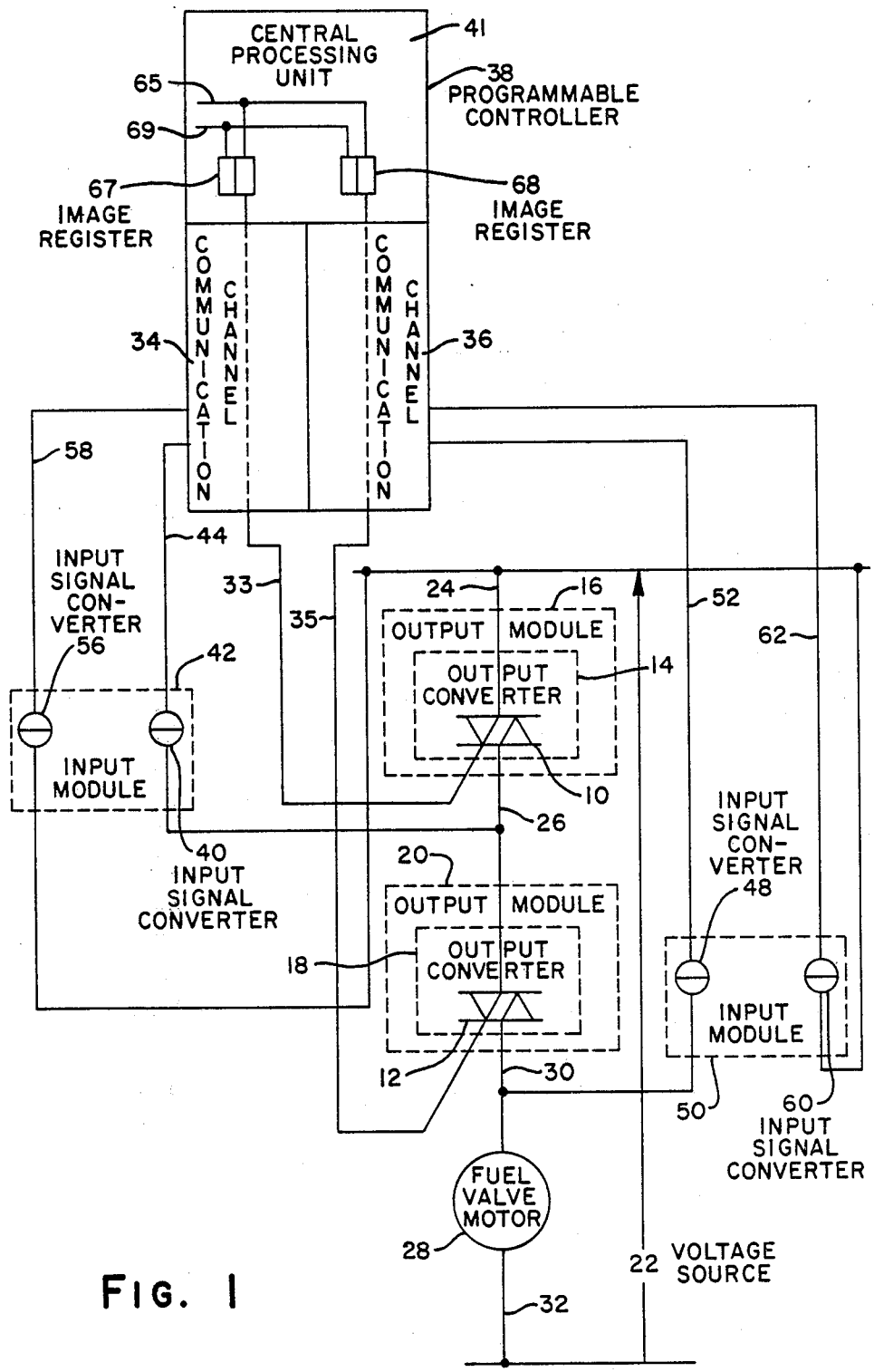
FIG. 1 is a simplified schematic of two output modules operated in series showing two series triacs driving an energize-to-start, deenergize-to-stop field device.

Applying the present invention to a steam generator burner management system, FIG. 1 is a simplified schematic of a portion of the burner management system showing series triacs 10 and 12. Triac 10 is a load power switching device and is an integral circuit component of output converter 14. Output converter 14 is one of sixteen output converters located on output module 16.

Triac 12 is a load power switching device and is an integral circuit component of output converter 18. Output converter 18 is one of sixteen output converters located on output module 20.

Output converter 14 is connected to the alternating current voltage source 22 by conductor 24. Output converters 14 and 18 are interconnected by conductor 26. The field device, fuel valve motor 28, is connected to output module 20 by conductor 30 and to the ground conductor of alternating current voltage source 22 by conductor 32.

Series triacs 10 and 12 are simultaneously switched to the conducting state by two different and independent communication channels 34 and 36 of programmable controller 38. Triac 10 is switched to the conducting state by signal 33 of the first channel 34 and triac 12 is switched to the conducting state by signal 35 of the second channel 36.

Although triacs 10 and 12 are switched from the nonconducting to the conducting state by separate channels of programmable controller 38, under operating conditions the logic within programmable controller 38 generates a momentary single switching signal 65. When set, the output of image registers 67 and 68, respectively signals 33 and 35, will each be a logic 1. It follows that both triacs 10 and 12 will be in the on state as indicated by signals 44 and 52 each being a logic 1. After signal 69 has reset image registers 67 and 68, the output of image registers 67 and 68, respectively signals 33 and 35, will each be a logic 0. It follows that both triacs 10 and 12 will be in the off state as indicated by signals 44 and 52 each being a logic 0. Thus when image registers 67 and 68 are set, both triacs 10 and 12 are in the one state; and when image registers 67 and 68 are reset, both triacs 10 and 12 are in the off state. Signal 44 is, therefore, not only an indication of the state of triac 10 but also an indirect indication of the output of image register 67. Similarly, signal 52 is not only an indication of the state of triac 12 but also an indirect indication of the output of image register 68.

When an image register, such as image register 67 or image register 68, fails to produce the output signal it should produce, it is said to have slipped a bit. Since the output signal or bit is either a 1 or 0, a slipped bit is considered a failure or error. For example, if the output signal of an image register should be a 1 and the output register has slipped a bit, the erroneous output will be a 0. Since both image registers 67 and 68 operate in unison as well as in unison with triacs 10 and 12, a failure in either image register 67 or 68 can be detected by the circuitry of FIG. 1 in the same manner as the failure of a triac in the unsafe mode. The circuitry of this invention does not distinguish between the failure of an image register or the associated triac but does distinguish between which of the triacs and associated image register has failed.

Triac switching signals 33 and 35 are brought out through two different channels 34 and 36 to assure that a fault in communication between the central processing unit 41 of programmable controller 38 and the respective output modules 16 and 20 or an error in image register 67 or 68 does not cause a hazardous condition by inadvertently energizing fuel valve motor 28. If a discrepancy occurs due to a breakdown in communication or failure of either image register 67 or 68, that is if one triac is switched to the conducting state while the other triac is not switched to the conducting state, fuel valve motor 28 would not energize and thereby remains in the more safe closed position.

Input signal converter 40, which is electrically connected to the output of triac 10, is one of sixteen input converters on input module 42. Input signal converter 40 monitors the state of triac 10 and generates a feedback signal 44 that feeds back to channel 34 of programmable controller 38.

Input signal converter 48, which is electrically connected to the output of triac 12, is one of sixteen input converters on input module 50. Input signal converter 48 monitors the state of triac 12 and generates a feedback signal 52 that feeds back to channel 36 of programmable controller 38.

Signal 44 is a logic signal from input converter 40 which monitors the output of triac 10. Signal $\overline{44}$ is the logical inverse of signal 44 such that when signal 44 is a logic 1, signal $\overline{44}$ is a logic 0 and when signal 44 is a logic 0, signal $\overline{44}$ is a logic 1.

Input converter 56 is an input converter on input module 42. Signal 58 originates from input converter 56. Input converter 56 monitors the electrical connection and communication to input module 42 on which input converters 40 and 56 reside to assure that input module 42 is electrically connected to programmable controller 38, is communicating properly and power is available from alternating current voltage source 22. Typically, sixteen input converters reside on each input module. The last input converter on input module 42 has been arbitrarily selected to serve the electrical connection and communication monitoring function.

Signal 52 is a logic signal that originates from input converter 48 which monitors the output of triac 12. Signal $\overline{52}$ is the logical inverse of signal 52.

Input converter 60 is an input converter on input module 50. Signal 62 originates from input converter 60. Input converter 60 monitors the physical connection and communication to input module 50 on which input converters 48 and 60 reside to assure that the input module 50 is electrically connected to programmable controller 38, communicating properly with programmable controller 38 and power is available from alternating current voltage source 22.

Figure 2:
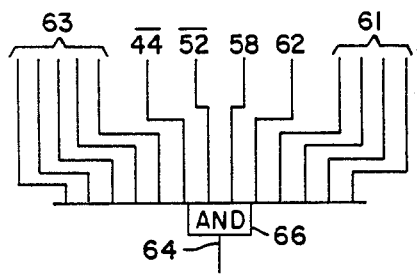
FIG. 2 is a logic diagram showing which signals must be present in order to obtain a start-up permissive satisfied condition.

When the burner management system utilizes programmable controller 38, the purge permissive signal, including a portion of the monitor circuit of the present invention, is generated as shown in the logic diagram of FIG. 2.

The logic inverse of signals 44 and 52, respectively, $\overline{44}$ and $\overline{52}$ are used to generate the purge permissive satisfied signal 64.

The input signals to AND gate 66 fall into two categories. Included in the first category are specifically shown input signals $\overline{44}$, $\overline{52}$, 58 and 62. Input signals 44 and 52 represent redundant indications that fuel valve motor 28 energized by triac 10 and triac 12 of FIG. 1 is deenergized. Input signals 58 and 62 indicate that the respective input modules are electrically connected to programmable controller 38, are communicating properly and power is available from alternating current voltage source 22. The combination of the four input signals $\overline{44}$, $\overline{52}$, 58 and 62 in AND gate 66 assures that a no voltage indication at the output of triac 10 or triac 12 is not the result of input module 42 or input module 50 being electrically disconnected from programmable controller 38, from lack of power or from a communication error that caused the error checking routine to turn off input module 42 or input module 50. Also included in the first category of input signals are input signals 61, similar to the four previous input signals, that indicate all other triacs are operating properly.

The second category of input signals, input signals 63, includes all input signals of other equipment pertaining to boiler startup that must be present prior to purging the furnace. The purge permissive satisfied signal 64 is the output signal from AND gate 66.

Monitoring the power to the input modules 42 and 50 on which the input converters 40 and 48 reside assures that the purge permissive satisfied signal 64 is not generated as a result of the inverted signals being generated because of the communication error checking routine turning the entire input module to the off state or as a result of the input module being electrically disconnected from programmable controller 38.

As shown in FIG. 2, when signals $\overline{44}$, $\overline{52}$, 58 and 62 are present, and a similar set of four signals (input signals 61) from other output module driven fuel valve motors, as well as the other necessary purge permissive prerequisites (input signals 63), the purge permissive is satisfied and purge permissive satisfied signal 64 becomes a logic 1. With the purge permissive satisfied, the operator can initiate the logic sequence, which is a furnace purge when the present invention is applied to a steam generator.

Figure 3:
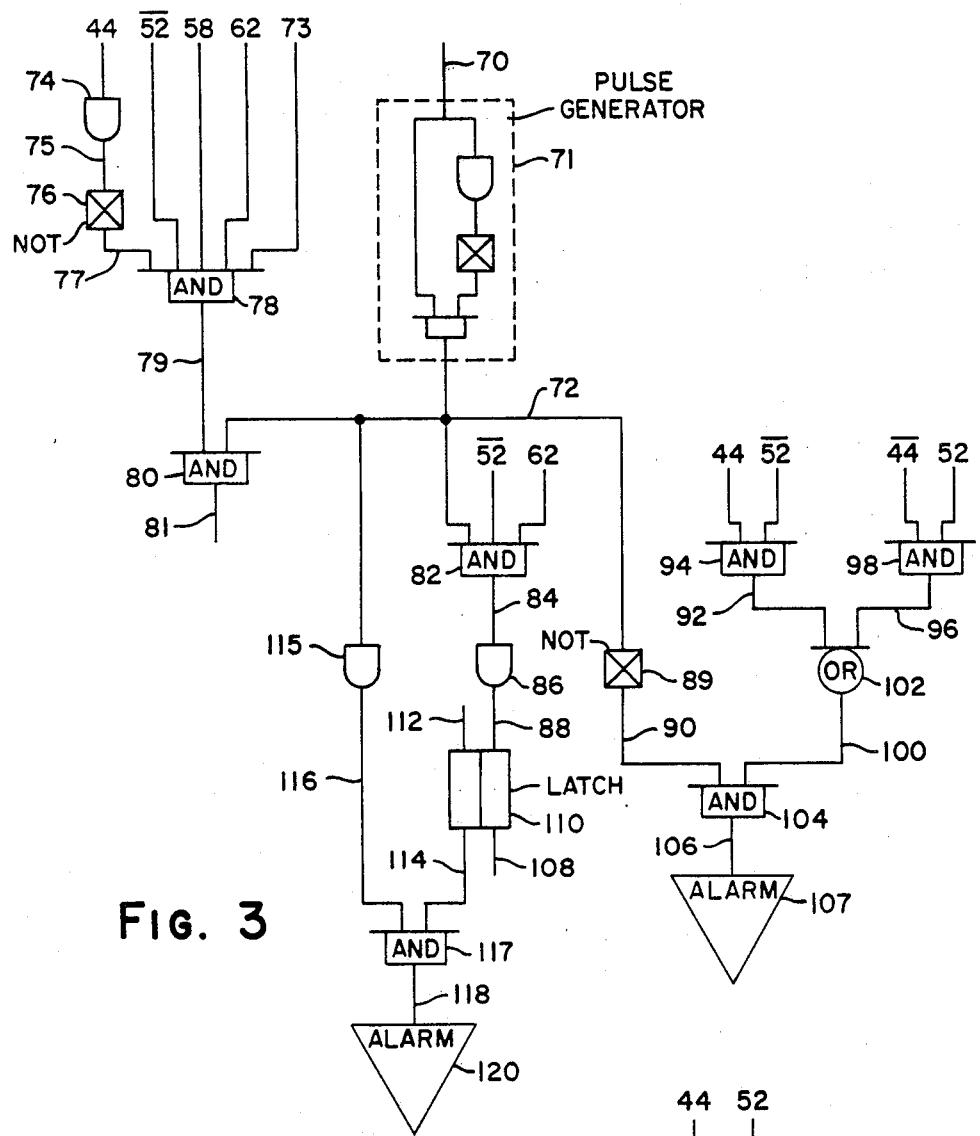
FIG. 3 is a logic diagram showing the implementation of the intermittent monitoring circuit.
Figure 4:
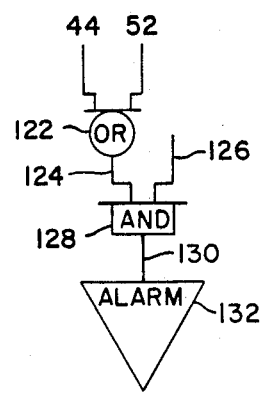
FIG. 4 is a logic diagram of the continuous monitoring circuit.

An intermittent monitoring circuit, shown in FIG. 3, is designed to monitor the integrity of triac 12 and image register 68 independently of the continuous monitoring circuit shown in FIG. 4. The intermittent monitoring circuit relies on the integrity of triac 10 and image register 67 when using signals 44 and $\overline{52}$ as inputs. The integrity of triac 10 and image register 67 are proven by the continuous monitoring circuit of FIG. 4 and are therefore known prior to initiating a burner start signal 70. The intermittent monitoring circuit checks the integrity of triac 12 and image register 68 each time the operator initiates a burner start signal 70. The presence of a burner start signal 70 causes pulse generating circuit 71 to switch the output of triac 10 to the on state prior to the burner start cycle. The output of pulse generating circuit 71 is signal 72, a logic 1 pulse the duration of which determines the duration of the intermittent monitoring test. The duration of the intermittent monitoring test has been selected to be 0.5 second.

Any change in the status of signal 44 is delayed by time delay 74 for the duration of the intermittent monitoring circuit test. The resulting delayed signal, signal 75, is passed through NOT gate 76 resulting in signal 77. AND gate 78 sums signals 77, $\overline{52}$, 58, 62 and 73 resulting in signal 79. Signal 79 is a logic 1 when triacs 10 and 12 are in the off state, the respective input modules are electrically connected and powered and the ignition permissives 73 have been met.

Signals 72 and 79 are summed by AND gate 80 producing signal 81 which switches triac 10 to the on state for a duration of 0.5 second. During this 0.5 second period, triac 12 is not switched to the on state. Voltage appearing at the output of triac 12 during this time period is an indication that either triac 12 has failed in the unsafe mode or image register 68 has failed. Energizing the fuel valve motor at this time does not create a hazardous condition as the prepurge permissives have been satisfied and the operator has initiated a burner start signal.

Signal 72 is summed with signals $\overline{52}$ and 61 by AND gate 82 to produce signal 84. Signal 84 is delayed by 0.1 second by time delay 86 resulting in signal 88.

When triac 12 has not failed in an unsafe mode, image register 68 has not failed and input module 50 is electrically connected to programmable controller 38, signal 84 is a logic 1 pulse of 0.5 second duration. Signal 88 is a logic 1 pulse of 0.4 second duration commencing at 0.1 second after burner start signal 70 is initiated. Signal 88 being a logic 1 sets latch 110. Latch 110 setting causes permissives to start signal 108 to become a logic 1 and a signal 114 to become a logic 0. Signal 114 being a logic 0 does not permit alarm 120 to energize during the intermittent test. Permissives to start signal 108 is further processed by logic, not shown, resulting in start complete signal 112 becoming a logic 1 after the duration of the intermittent test. Start complete signal 112 resets latch 110. Resetting latch 110 causes permissives to start signal 108 to be a logic 0 and signal 114 to be a logic 1.

When input module 50 is physically and electrically connected to programmable controller 38, the burner start signal has been initiated and triac 12 has failed in the unsafe mode, signal $\overline{52}$ will not permit the pulse signal 72 to pass through AND gate 82 thereby causing signal 84 to remain a logic 0. Signal 88 remains a logic 0. Latch 110 remains in the reset state with permissives to start signal 108 remaining a logic 0 and signal 114 remaining a logic 1. Signal 72 is delayed by time delay 115 for a time period greater than the delay of time delay 86 but less than the duration of the intermittent test. The duration of time delay 115 has been selected to be 0.2 second. The time difference between time delays 86 and 115 permits latch 110 to set if signal 88 is a logic 1. Under the condition of triac 12 failing in the unsafe mode, alarm signal 118 becomes a logic 1 when time delay 115 times out and signal 116 becomes a logic 1 as signals 114 and 116 are summed in AND gate 117 forming alarm signal 118. Alarm signal 118 energizes alarm 120 which indicates that triac 12 has failed in the unsafe mode.

Having passed through NOT gate 89, signal 90 is the logical inverse of signal 72. For the duration of the intermittent monitoring test, signal 90 remains a logic 0. Signal 90 sums with signal 100 in AND gate 104 to form alarm signal 106. Alarm signal 106 is turned off by signal 90 for the duration of the intermittent monitoring test.

During the intermittent test, signal 90 will remain a logic 0. At all time other than during the intermittent test, signal 90 will remain a logic 1. Of the inputs to AND gate 104, signal 100, which is the output from OR gate 102, will further limit when alarm signal 106 energizes alarm 107. Alarm 107 indicates that triac 10 or triac 12 has failed in an unsafe mode or image register 67 or image register 68 has failed. The input signals to OR gate 102 are signals 92 and 96. Signal 92 is the sum of signal 44 and $\overline{52}$ in AND gate 94. Signal 92 will cause alarm 107 to energize when input signal 44 is a logic 1 and input signal $\overline{52}$ is a logic 1 due to failure of triac 12 or image register 68. Signal 96 is the sum of signals $\overline{44}$ and 52 in AND gate 98. Signal 96 will cause alarm 107 to energize when no voltage is present at the output of triac 10 but voltage is present at the output of triac 12.

With the steam generator in operation, the control and monitor circuit continuously monitors the integrity of triac 10 and the integrity of the series combination of triac 10 and triac 12. The continuous monitoring determines if triac 10 is conducting when it should be conducting or if both triac 10 and triac 12 are conducting when they should not be conducting. As shown in FIG. 1, input signal converter 40 is electrically connected to the output of triac 10 and generates a feedback signal 44 that feeds back to channel 34 of programmable controller 38. Input signal converter 48 is electrically connected to the output of triac 12 and generates a feedback signal 52 that feeds back to channel 36 of programmable controller 38. When both triacs 10 and 12 conduct, feedback signal 44 will be a logic 1 and feedback signal 52 will also be a logic 1 . Feedback signal 52 being a logic 1 indicates that fuel valve motor 28 driven by triac 12 is energized.

As shown in FIG. 4, input signals 44 and 52 enter OR gate 122 forming signal 124. Signal 124 sums with burner valve logic not in startup stage and not in operation stage signal 126 in AND gate 128 to form alarm signal 130 which sounds alarm 132 when triac 10 or the series combination of triac 10 and triac 12 have failed in the unsafe mode and the burner valve logic is not required. This portion of the control and monitor circuit continuously monitors the integrity of triac 10 and the integrity of series combination of triac 10 and triac 12.

We claim:

1. In a programmable controller based logic system having an alarm system for alarming malfunctions, an alternating current voltage source, first and second image registers, electronic input and output modules, said output modules containing solid state switches capable of switching the output module load power, and first and second output module solid state switches connected in series to energize and deenergize an energize-to-start, deenergize-to-stop field device, a method of operating a programmable controller based logic system comprising:
   a. monitoring said first image register, said second image register and the integrity of the series combintion of said first and second solid state switches;
   b. independently of and simultaneously with step (a), monitoring said first image register and the integrity of said first solid state switch;
   c. independently of steps (a) and (b), monitoring intermittently said second image register and the integrity of said second solid state switch; and
   d. alarming an unsafe condition whenever said monitoring indicates the failure of said first image register. and second image register, said first solid state switch, said second solid state switch or the series combination of said first solid state switch and said second solid state switch.

2. The method of operating a programmable controller based logic system as recited in claim 1 further comprising the step of: monitoring said input modules continuously to assure that said input modules which monitor said output modules on which said solid state switches reside are electrically connected to said programmable controller and that power is available to said input modules from said alternating current voltage source.

3. The method of operating a programmable controller based logic system as recited in claim 1: wherein said step of monitoring intermittently said second image register and the integrity of said second solid state switch includes initiating a start signal; generating a pulse of approximately one-half second duration; switching said first of two series solid state switches to the on-state for the duration of said pulse; detecting the presence or absence of voltage at the output of said second of two series solid state switches for the duration of the pulse; and latching in a permissive to start upon the detection of absence of voltage at the output of said second of two series solid state switches.

4. The method of operating a programmable controller based logic system as recited in claim 1, 2, or 3: wherein said step of monitoring said first image register and the integrity of said first solid state switch includes monitoring said first image register and the integrity of said first solid state switch while the burner associated field device logic is not in the startup stage.

5. The method of operating a programmable controller based logic system as recited in claim 4: wherein said step of monitoring said first image register and the integrity of said first solid state switch includes monitoring said first image register and the integrity of said first solid state switch while the burner associated field device logic is not in the operation stage.

6. The method of operating a programmable controller based logic system as recited in claim 1, 2, or 3: wherein said step of monitoring said first image register, said second image register and the integrity of the series combination of said first and second solid state switches includes monitoring said first image register, said second image register and the integrity of the series combination of said first and second solid state switches while the field device logic is not in the startup stage.

7. The method of operating a programmable controller based logic system as recited in claim 6: wherein said step of monitoring said first image register, said second image register and the integrity of the series combination of said first and second solid state switches includes monitoring said first image register, said second image register and the series combination of said first and second solid state switches while the field device logic is not in the operation stage.

8. The method of operating a programmable controller based logic system as recited in claim 2: wherein said step of monitoring said input modules continuously to assure that said input modules which monitor said output modules on which said solid state switches reside are electrically connected to said programmable controller and that power is available to said input modules includes controlling normally when said input modules are electrically connected to said programmable controller.

9. The method of operating a programmable controller based logic system as recited in claim 2: wherein said step of monitoring said input modules continuously to assure that said input modules which monitor said output modules on which said solid state switches reside are electrically connected to said programmable controller and that power is available to said input modules includes alarming the condition of at least one of said input modules being electrically disconnected from said programmable controller.

10. In a programmable controller based burner management system having an alarm system for alarming malfunctions, an alternating current voltage source, first and second image registers, electronic input and output modules, said output modules containing solid state switches capable of switching the output module load power, and first and second output module solid state switches connected in series to energize and deenergize an energize-to-start, deenergize-to-stop burner associated field device, a method of operating a programmable controller based burner management system comprising:

a. monitoring said first image register, said second image register and the integrity of the series combination of said first and second solid state switches;
b. independently of and simultaneously with step (a), monitoring said first image register and the integrity of said first solid state switch;
c. independently of step (a) and (b), monitoring intermittently said second image register and the integrity of said second solid state switch; and
d. alarming an unsafe condition whenever said monitoring indicates the failure of said first image register, said second image register, said first solid state switch, said second solid state switch or the series combination of said first solid state switch and said second solid state switch.

11. The method of operating a programmable controller based burner management system as recited in claim 10 further comprising the step of: monitoring said input modules continuously to assure that said input modules which monitor said output modules on which said solid state switches reside are electrically connected to said programmable controller and that power is available to said input modules from said alternating current voltage source.

12. The method of operating a programmable controller based burner management system as recited in claim 10: wherein said step of monitoring intermittently said second image register and the integrity of said second solid state switch includes initiating a burner start signal; generating a pulse of approximately one-half second duration; switching said first of two series solid state switches to the on-state for the duration of said pulse; detecting the presence or absence of voltage at the output of said second of two series solid state switches for the duration of the pulse; and latching in a permissive to start upon the detection of absence of voltage at the output of said second of two series solid state switches.

13. The method of operating a programmable controller based burner management system as recited in claim 10, 11, or 12: wherein said step of monitoring said first image register and the integrity of said first solid state switch includes monitoring said first image register and the integrity of said first solid state switch while the burner associated field device logic is not in the startup stage.

14. The method of operating a programmable controller based burner management system as recited in claim 13: wherein said step of monitoring said first image register and the integrity of said first solid state switch includes monitoring said first image register and the integrity of said first solid state switch while the burner associated field device logic is not in the operation stage.

15. The method of operating a programmable controller based burner management system as recited in claim 10, 11, or 12: wherein said step of monitoring said first image register, said second image register and the integrity of the series combination of said first and second solid state switches includes monitoring said first image register, said second image register and the integrity of the series combination of said first and second solid state switches while the burner associated field device logic is not in the startup stage.

16. The method of operating a programmable controller based burner management system as recited in claim 15: wherein said step of monitoring said first image register, said second image register and the integrity of the series combination of said first and second solid state switches includes monitoring said first image register, said second image register and the series combination of said first and second solid state switches while the burner associated field device logic is not in the operating stage.

17. The method of operating a programmable controller based burner management system as recited in claim 11: wherein said step of monitoring said input modules continuously to assure that said input modules which monitor said output modules on which said solid state switches reside are electrically connected to said programmable controller and that power is available to said input modules includes controlling normally when said input modules are electrically connected to said programmable controller.

18. The method of operating a programmable controller based burner management system as recited in claim 11: wherein said step of monitoring said input modules continuously to assure that said input modules which monitor said output modules on which said solid state switches reside are electrically connected to said programmable controller and that power is available to said input modules includes alarming the condition of at least one of said input modules being electrically disconnected from said programmable controller.

* * * * *